United States Patent

Nohmura

[15] 3,704,687
[45] Dec. 5, 1972

[54] FISH FARMING NEST
[72] Inventor: Ryotaro Nohmura, No. 19-19, 3-chome, Senriyama Nishi, Suita-shi, Osaka-fu, Japan
[22] Filed: Dec. 21, 1970
[21] Appl. No.: 99,808

[52] U.S. Cl. ................................................119/3
[51] Int. Cl. ...........................................A01k 61/00
[58] Field of Search ...........119/3, 2, 4, 5, 20; 43/102

[56] References Cited

UNITED STATES PATENTS 2,950,562   8/1960   Lothrop ...............................43/102
1,663,996   4/1928   Adams et al. ........................119/4
3,172,392   3/1965   Schultz ...............................119/20
3,561,402   2/1971   Ishida et al. .........................119/3

Primary Examiner—Hugh R. Chamblee
Attorney—Wenderoth, Lind & Ponack

[57] ABSTRACT

An artificial fish farming nest. The nest is formed in the shape of a dome and has a plurality of holes through the wall of said dome. The dome is submerged so that its edge is placed on the bottom of the sea, thereby giving buoyancy to the fish farming nest itself and thus preventing it from being buried in the bottom of the sea within a short space of time.

3 Claims, 3 Drawing Figures

PATENTED DEC 5 1972　3,704,687
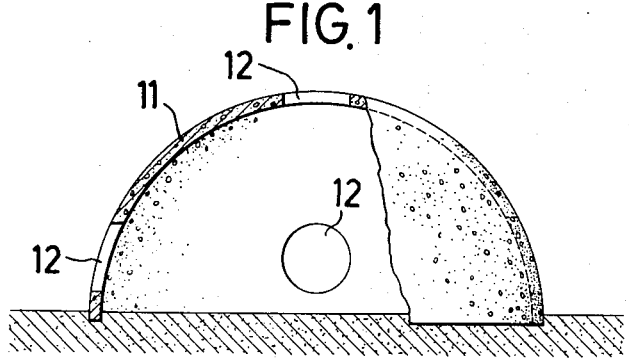
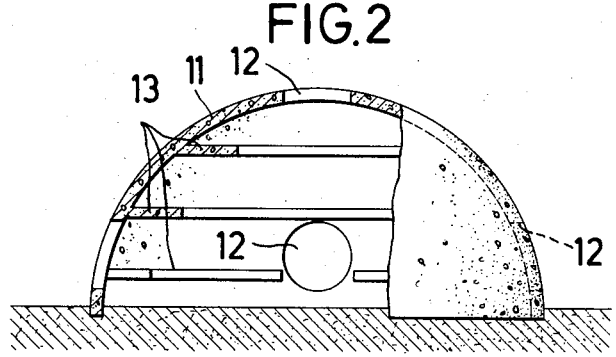
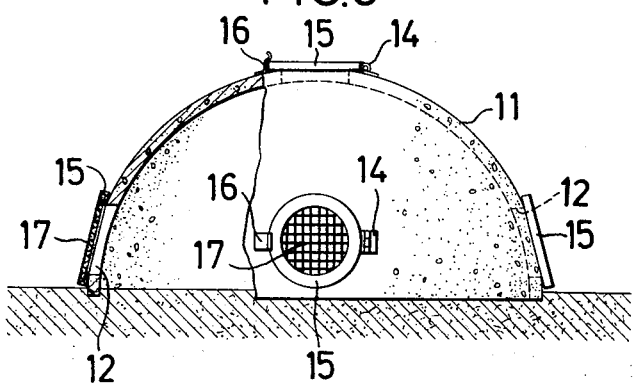
RYOTARO NOHMURA,
INVENTOR.
BY Wenderoth Lind & Ponack
Attorneys

FISH FARMING NEST

This invention relates to an artificial fish farming nest.

Known artificial fish farming nests have included a framework made up by combining concrete frames or by making use of waste materials.

However, the fish farming nest consisting of such a framework had a disadvantage in that it did not afford much convenience for fish to stay therein for very long, and moreover it was easily deformed or buried in the bottom of the sea within a short period of time, thus rendering it unsuitable for an artificial fish farming nest.

This invention provides an artificial fish farming nest serving as a long term durable fish farming chamber, which is formed in the shape of a dome unlike that of the known artificial fish farming nest. A plurality of penetrating holes are provided on the walls of the dome-shaped body, which is so submerged that its open, bottom edge is placed on the bottom of the sea, thereby giving buoyancy to the fish farming nest itself and thus preventing it from subsiding and being buried in the bottom of the sea within a short space of time.

The first object of this invention is to provide an artificial fish farming nest which is formed in the shape of a dome, thereby giving it buoyancy so that it may serve as a fish farming nest for a long period of time.

A second object of this invention is to provide an artificial fish farming nest, wherein a plurality of shelves are provided inside the dome-shaped body, thereby affording far greater facility for fish to stay longer inside the farming nest.

A third object of this invention is to provide an artificial fish farming nest, wherein a lid member consisting of a net plate is openably provided over each penetrating hole formed on the wall of the dome-shaped body of the nest, thereby protecting comparatively small fish that can pass through the meshes of the net plate from harm from larger fishes that can not pass through said meshes.

The objects mentioned hereinbefore are attainable by each element of this invention and the combination thereof, and the preferred embodiments of this invention will be illustrated by the detailed description given hereunder with reference to the annexed drawings, of which:

FIG. 1 is an elevation with a longitudinal section in part, showing an embodiment of the artificial fish farming nest of this invention.

FIG. 2 is an elevation with a longitudinal section in part, showing another embodiment of the artificial fish farming nest of this invention.

FIG. 3 is an elevation with a longitudinal section in part, showing still another embodiment of the artificial fish farming nest of this invention.

In FIGS. 1 through 3, the numeral 11 designates a dome-shaped body of the artificial fish farming nest consisting of concrete, synthetic resin, or metal material. On the top wall and the peripheral wall of the body 11 are provided an appropriate number of penetrating holes 12 enabling fish to go in and out therethrough. It is desirable that penetrating holes 12 be provided each in a corresponding position with each other on the peripheral wall of the body 11. This arrangement is desirable because, when a fish choses as its entrance route one of the penetrating holes 12 on the peripheral wall, another hole opposed thereto serves as a lighting window for said entrance route.

FIG. 2 shows another embodiment, wherein a plurality of shelves 13 are provided inside the body 11 of the fish farming nest. These shelves 13 enable fish to stay longer inside the dome-shaped body 11 of the nest.

FIG. 3 shows still another embodiment of this invention, wherein a lid member 15 consisting of a net plate 17 is openably attached with hinges 14 to the external face of each penetrating hole 12 provided on the dome-shaped body of the nest shown in FIG. 1. Each penetrating hole 12 can be closed with the lid member 15 through a metal piece 16. It must be so arranged that net plates 17 of identical mesh are used for all the penetrating holes 12 of each fish farming nest.

This unification of the mesh of the net plates 17 of each fish farming nest makes it possible to farm therein only such fish whose size allows them to go in and out through the meshes of the respective net plates 17, thereby bringing about the effect of protecting small fish from harm from larger fish that are prevented from entering the farming nest.

The aforementioned artificial fish farming nest according to this invention is used by depositing the dome-shaped body thereof on the bottom of the sea, the dome-shaped body 11 being so submerged that the open, bottom edge thereof may be more or less buried in the bottom of the sea, fish being invited to enter the body 11 through the penetrating holes 12 thereof and stay safe inside said body of the fish farming nest.

Particularly, since the artificial fish farming nest of this invention is formed in the shape of a dome, not only does it have great durability and wave resistance, but it helps develop vertical convection current as well as whirlpools by its dome-shaped spherical surface, thereby promoting the growth of vegetable plankton with abundant inorganic nutritious salts existing in the sea water, and inviting in turn animal plankton and minute fish feeding thereon. This results in larger-sized fish being lured to the submerged artificial fish farming nest, wherein they are likely to stay for a long period of time, going in and out of the body 11 of the farming nest through the penetrating holes 12 thereof.

Furthermore, the plurality of shelves 13 provided in the body 11 as shown in FIG. 2 make it more convenient for the fish to stay therein, thus rendering body 11 very suitable for a fish farming chamber.

Furthermore, in the case of a fish farming nest whose penetrating holes 12 are closed by lid members 15 consisting of net plates 17 as shown in FIG. 3, each mesh of the net plates 17 provides a gate to and from the body 11, but said mesh prevents fish larger from entering the body 11, thereby producing the effect of protecting small fish from harm from larger fish.

I claim:

1. A fish farming nest comprising a substantially hollow dome-shaped body providing a fish nesting chamber of a size to allow fish to enter into the chamber, said body adapted to be positioned on a bottom surface of a water confined area and retained thereon by the weight of the body resting on it's bottom end therein, a bottom end of said body being open, and said body having a plurality of holes extending therethrough into said chamber.

2. A fish farming nest as claimed in claim 1, further comprising shelves positioned within said chamber.

3. A fish farming nest as claimed in claim 1, further comprising openable lids positioned over each of said holes, each of said lids including a net plate covering said respective hole, the mesh of each of said net plates being identical to selectively permit small fish to enter into the chamber of the body.

* * * * *